United States Patent
Baron et al.

(10) Patent No.: US 8,527,522 B2
(45) Date of Patent: Sep. 3, 2013

(54) CONFIDENCE LINKS BETWEEN NAME ENTITIES IN DISPARATE DOCUMENTS

(75) Inventors: Alex Baron, Canton, MA (US); Marjorie Ruth Freedman, Cambridge, MA (US); Ralph M. Weischedel, Canton, MA (US); Elizabeth Megan Boschee, Belmont, MA (US)

(73) Assignee: Ramp Holdings, Inc., Boston, MA (US)

( * ) Notice: Subject to any disclaimer, the term of this patent is extended or adjusted under 35 U.S.C. 154(b) by 503 days.

(21) Appl. No.: 12/344,871

(22) Filed: Dec. 29, 2008

(65) Prior Publication Data

US 2010/0076972 A1    Mar. 25, 2010

Related U.S. Application Data

(60) Provisional application No. 61/094,756, filed on Sep. 5, 2008.

(51) Int. Cl.
*G06F 17/30* (2006.01)
(52) U.S. Cl.
USPC .......................................... 707/749
(58) Field of Classification Search
None
See application file for complete search history.

(56) References Cited

U.S. PATENT DOCUMENTS

| | | | |
|---|---|---|---|
| 6,137,911 A * | 10/2000 | Zhilyaev | 382/225 |
| 6,493,709 B1 * | 12/2002 | Aiken | 1/1 |
| 2002/0064316 A1 * | 5/2002 | Takaoka | 382/305 |
| 2003/0149745 A1 * | 8/2003 | Dunay et al. | 709/217 |
| 2004/0025192 A1 * | 2/2004 | Angel et al. | 725/139 |
| 2005/0060643 A1 * | 3/2005 | Glass et al. | 715/501.1 |
| 2005/0278321 A1 * | 12/2005 | Vailaya et al. | 707/3 |
| 2007/0067291 A1 * | 3/2007 | Kolo et al. | 707/6 |
| 2009/0132566 A1 * | 5/2009 | Ochi et al. | 707/100 |

* cited by examiner

*Primary Examiner* — Bai D. Vu
(74) *Attorney, Agent, or Firm* — Occhiuti Roblicek & Tsao LLP

(57) ABSTRACT

The invention relates to cross-document entity co-reference systems in which naturally occurring entity mentions in a document corpus are analyzed and transformed into name clusters that represent global entities. In a first aspect of the invention, a name variation module analyzes naturally occurring names of entities extracted from the document corpus and provides an initial set of equivalent names that could refer to the same real world entity. In a second aspect of the invention, a disambiguation module takes the initial set of equivalent names and uses an agglomerative clustering algorithm to disambiguate the potentially co-referent named entities.

6 Claims, 9 Drawing Sheets

300

(A) Name Strings: Abu Abbas, Abu Mazen, Adam Smith, A Smith, Andy Smith, Mahmoud Abbas, Muhammed Abbas .... } 310

(B) Name String Pairs with Score:
0.9 Mahmoud Abbas → Abu Mazen
0.7 Mahmoud Abbas → Abu Abbas } 320
0.8 Mahmoud Abbas → Muhammed Abbas
. . . .

(C) Set of Equivalent Name Strings: ( Abu Mazen, Mahmoud Abbas, Muhammed Abbas, Abu Abbas, ... ) 330

(D) Document Entity Mentions:
340a: ... election of Abu Mazen
340b: Abu Abbas was arrested ... Abbas hijacked
340c: Palestinian President Mahmoud Abbas ... Abbas said
} 340

(E) Entity Clusters:
350: Abu Mazen / Mahmoud Abbas — *Palestinian Leader*
360: Muhammed Abbas / Abu Abbas — *convicted terrorist*

CONFIDENCE LINKS BETWEEN NAME ENTITIES IN DISPARATE DOCUMENTS

CROSS-REFERENCE TO RELATED APPLICATION

This claims the benefit of copending U.S. Provisional Patent Application No. 61/094,756, filed Sep. 5, 2008, which is hereby incorporated by reference herein in its entirety.

GOVERNMENT CONTRACT

The U.S. Government has a paid-up license in this invention and the right in limited circumstances to require the patent owner to license others on reasonable terms as provided for by the terms of Contract No. HR0011-06-C-0022 awarded by DARPA.

TECHNICAL FIELD

This invention relates to methods and systems for determining confidence links between named entities in disparate documents, and is particularly applicable to natural language processing (NLP) applications.

BACKGROUND

Cross-document entity co-reference refers generally to the problem of identifying whether mentions of names in different documents refer to the same or distinct entities. For example, the same entity can be referred to by more than one name string (e.g., Mahmoud Abbas and Abu Mazen both refer to the Palestinian Leader), and the same name string can be shared by more than one entity (e.g., John Smith is a common name).

Many previous efforts in cross document entity co-reference have focused on only entity disambiguation, using string retrieval to collect many documents that contain the same name. Others used artificially ambiguated data or analyzed only documents that contained well-structured English with proper grammar and punctuation. Moreover, much of this prior effort has analyzed only one entity type (usually persons), or only one source of data (news articles).

However, names in real-world situation in natural language documents are not always so well-structured. In a multi-genre multi-lingual environment, names can be misspelled, mistranslated, incorrectly transcribed or transliterated, have multiple aliases, and/or can have multiple equally valid spellings. The diversification of data sources to unstructured text (e.g., blogs, chats, e-mail correspondence, and web pages), speech, and foreign languages has made the cross-document co-reference task more difficult.

Available information extraction algorithms fail to perform with the same degree of accuracy on documents with invalid linguistic constructions that permeate these natural language sources. Therefore, systems and methods that are more capable of analyzing named entities in natural language situations are desirable.

SUMMARY

This invention relates to methods and systems for determining confidence links between named entities in natural language documents.

As used herein, a "similarity score" refers to a measure of the similarity between two name strings in a pair. As used herein, "confidence level" refers to a measure of reliability associated with a matching algorithm or the data source used by the algorithm. An "algorithm-specific similarity score" refers to a degree of similarity between two name strings in a pair as determined by a particular algorithm. In an embodiment where a name string pair is evaluated by more than one algorithm, the similarity score for the pair generally refers to the highest algorithm-specific similarity score assigned to the particular pair. In alternative embodiments, the similarity score may be determined based on other functions of the algorithm-specific similarity scores. An "entity" includes, but is not limited to, persons, organizations, geopolitical entities, locations, and facilities.

In one aspect of the invention, a method or a system for generating a set of equivalent names accumulates name strings from possible matching pairs based on a comparison between similarity scores assigned to the name pairs and a threshold. The set of equivalent names can be a cluster of names that potentially, but not necessarily, refer to the same global entity. In some embodiments, the similarity scores for each name pair are determined using a plurality of algorithms, such that each algorithm assigns an algorithm-specific similarity score to the name pair. In such embodiments, the algorithm-specific similarity score for a name pair can be based, at least in part, on a confidence level associated with a source of equivalency used by the algorithm that assigned the score. In some embodiments, each algorithm is directed to a different type of equivalence or similarity between the name strings in the name pair. For example, an aliases algorithm can link name pairs based on aliases that potentially refer to the same entity, while an alternative spelling algorithm can link name strings based on common misspellings or distortions of the name strings.

In one aspect of the invention, a system or a method generates a set of equivalent names for named entities in a document by generating a token-subset tree. A token-subset tree algorithm generally applies to name variants that share some or most words (or "tokens"). In some embodiments, starting with tokens obtained from the input name, the algorithm builds tree-like structures out of all the unique names in a document set that have tokens that overlap with those of the input name string, and accumulates names into an equivalent set based on an ambiguity score assigned to the names in the tree. In some embodiments, the ambiguity score for each node is determined based on the "meaning count" associated with the node. As used herein, the meaning count of a node refers to the number of edges originating from the node. The lower the meaning count, the less ambiguous the name string associated with the node.

In one aspect of the invention, a disambiguation system is configured to further process the set of equivalent names generated by the methods and systems described above, or other suitable name variation system. In some embodiments, the disambiguation system receives an initial set of equivalent names for name strings for which entity clusters are to be created. The disambiguation system splits the set of equivalent names into subsets of singleton clusters, each singleton cluster representing a potentially unique global entity. Finally, the disambiguation system iteratively merges the singleton clusters into one or more global entity clusters by matching features associated with the singleton clusters and the global entity clusters. In some embodiments, the disambiguation system iteratively merges the singleton clusters in an order determined by the relative distinguishing capabilities of the features. For example, the disambiguation system can iteratively merge the singleton clusters by computing a feature match score for each pair of singleton clusters, selecting a singleton pair having the highest feature match score, and merging the selected singleton pair if the highest match score is equal to or greater than a threshold score. A method for disambiguating named entities in a document set is also provided.

BRIEF DESCRIPTION OF THE DRAWINGS

The foregoing and other objects and advantages of the invention will be appreciated more fully from the following further description thereof, with reference to the accompanying drawings. These depicted embodiments are to be understood as illustrative of the invention and not as limiting in any way:

FIG. 3 is an example of the operation of the system illustrated in FIG. 2, according to one illustrative embodiment of the invention;

DESCRIPTION OF ILLUSTRATIVE EMBODIMENTS

To provide an overall understanding of the invention, certain illustrative embodiments will now be described, including a system and a method for processing free-text queries in a topic classification system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
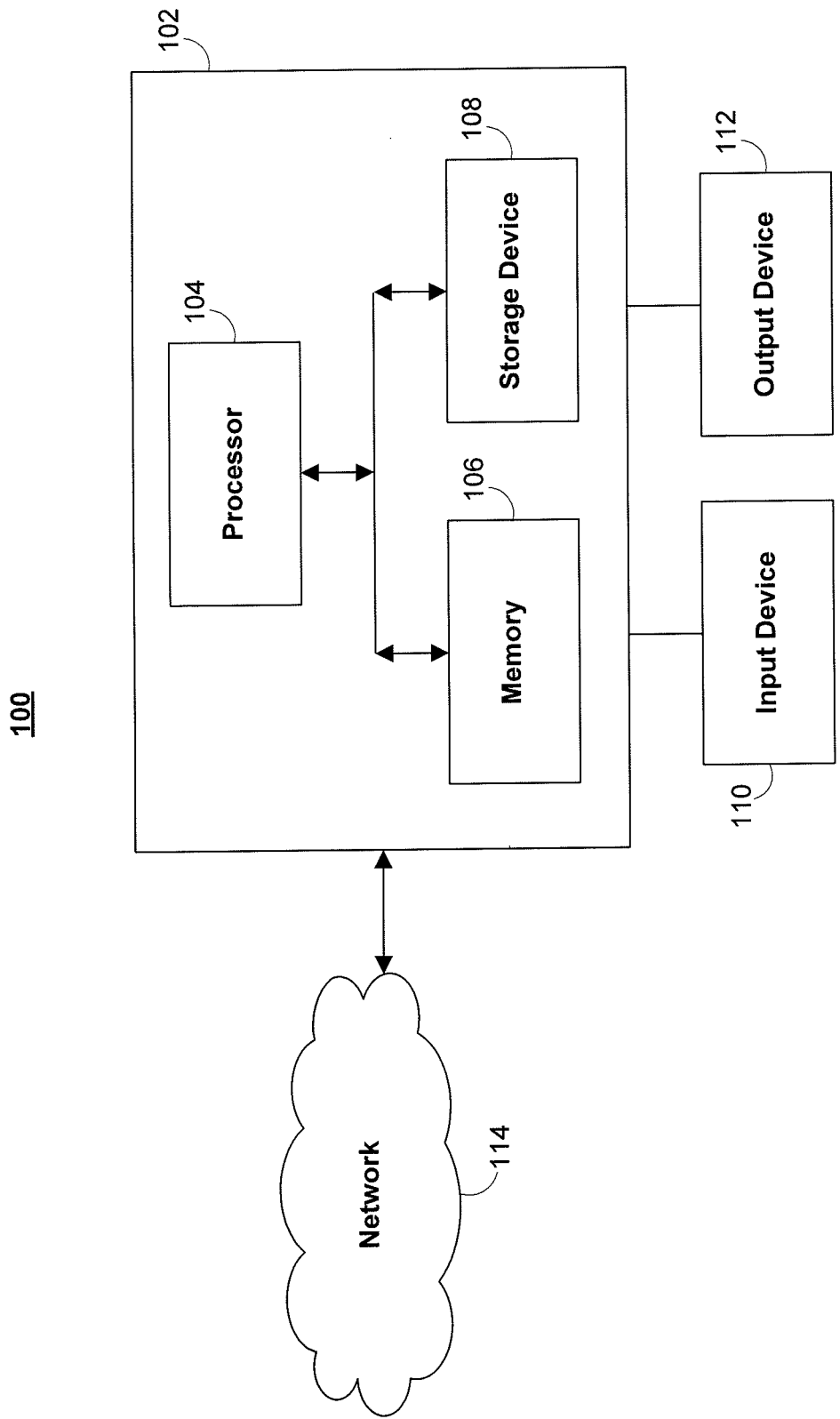
FIG. 1 shows a high level block diagram of a system in accordance with an illustrative embodiment of the invention.

FIG. 1 shows a high level block diagram of a system 100 in accordance with an illustrative embodiment of the invention. System 100 includes a computing device 102 that has processor 104, computer-readable medium 106, such as random access memory, and storage device 108. Computing device 102 also includes a number of additional external or internal devices. An external input device 110 and an external output device 112 are shown in FIG. 1. The input devices 110 include, without limitation, a mouse, a CD-ROM, or a keyboard. The output devices include, without limitation, a display or an audio output device, such as a speaker.

In general, computing device 102 may be any type of computing platform (e.g. one or more general or special purpose computers), and may be connected to network 114. Computing device 102 is exemplary only. Concepts consistent with the present invention can be implemented on any computing device, whether or not connected to a network.

Processor 104 executes program instructions stored in memory 106. Processor 104 can be any of a number of well-known computer processors, such as processors from Intel Corporation, of Santa Clara, Calif. Processor 104 can be used to run operating system applications, topic classification applications, and/or any other application. Processor 104 can drive output device 112 and can receive user inputs from input device 110.

Memory 106 includes one or more different types of memory that may be used for performing system functions. For example, memory 106 includes cache, Flash, ROM, RAM, or one or more different types of memory used for temporarily storing data.

Storage device 108 can be, for example, one or more storage mediums. Storage device 108, may store, for example, application data (e.g., documents that can be used to generate candidate responses based on free-text queries).

Figure 2:
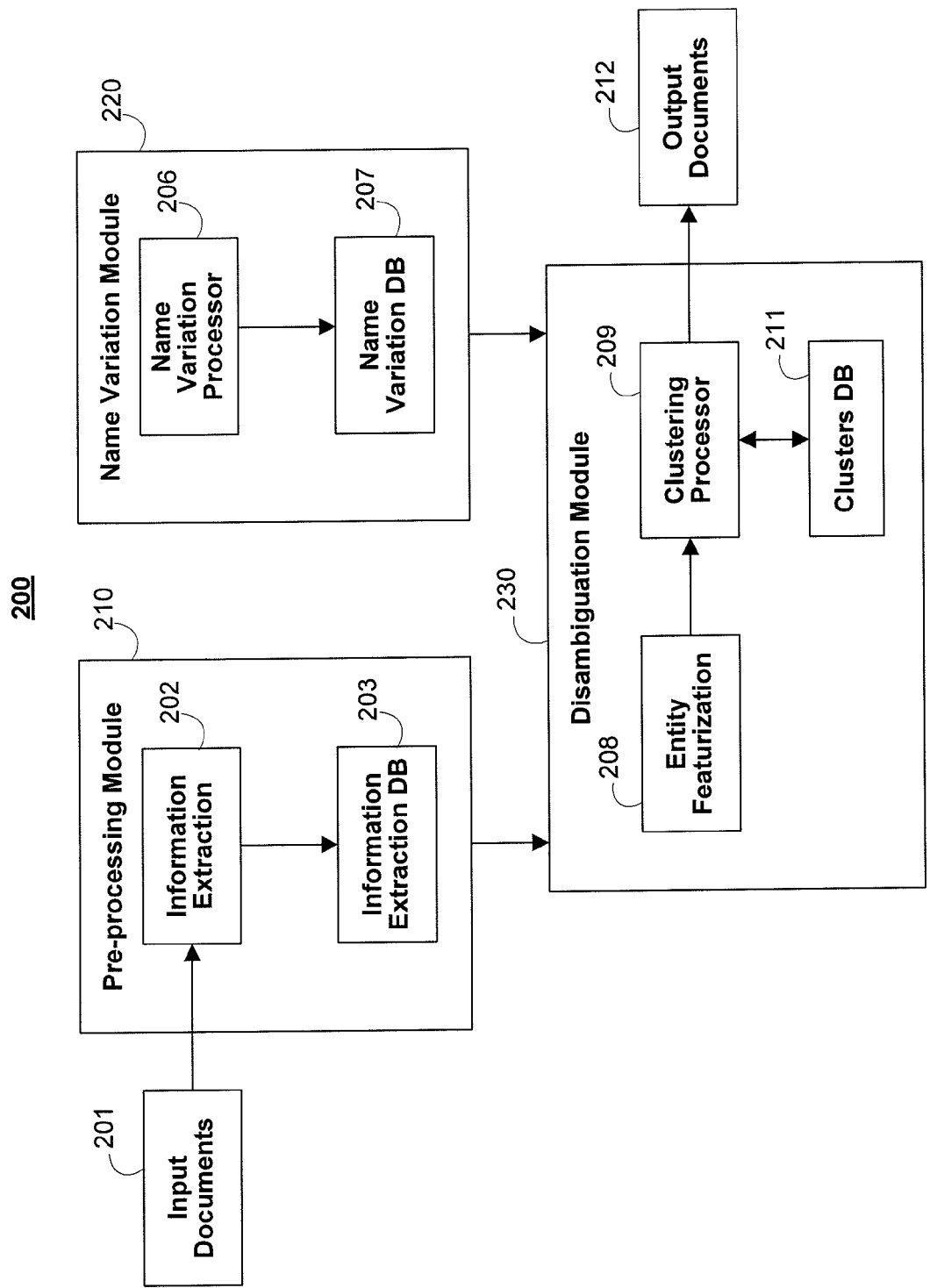
FIG. 2 shows a high level block diagram of name variation and disambiguation system, according to one illustrative embodiment of the invention.

FIG. 2 shows a high level block diagram of name variation and disambiguation system 200, according to one illustrative embodiment of the invention. System 200 can take a corpus of natural language documents and produce clusters of names that refer to unique global entities mentioned in the documents. System 200 is configured to resolve ambiguities in natural language, including, invalid linguistic constructions in unstructured text obtained from blogs, chats, e-mail correspondence, and web pages, to provide structured information about named entities. The structured information provided by system 200 is useful for various real-world applications, including information retrieval, question answering applications, watch lists, and cross-document relation and event co-reference in natural language processing applications.

System 200 includes preprocessing module 210, name variation module 220, and disambiguation module 230. In the illustrative embodiment, modules are implemented in software for execution by various types of processors, such as processor 104. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. System 200 is preferably implemented as computer readable instructions executable by processor 104 on computing device 102. The computer preferably includes storage device 108 for storing data collected and used by system 200.

While preprocessing module 210, matching module 220, and disambiguation module 230 are described illustratively herein as software modules, in alternative implementations, modules may be implemented as hardware circuits comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Preprocessing module 210 preferably extracts named entity mentions from input documents 201. In preprocessing module 210, information extraction module 202 receives input documents 201 for processing. In this embodiment, input documents 201 are a collection of files in SGML (Standard Generalized Markup Language) format. Input documents 201 can be produced from original source data, such as the transcript of an audio speech, an article, or a machine translation of a document. Input documents 201 can include such metadata markup as speaker turns in transcribed speech, paragraph breaks, date and time of an article, headlines, and so on. Information extraction module 202 preferably uses statistically-trained models to extract various pieces of information about named entities from input documents 201. The output of extraction module 202 preferably includes name mentions of entities, events associated with the entities, and relations among the named entities. Information extraction database 203 stores the output of extraction module 202. Information extraction database 203 can be any suitable relational database. One specific preprocessing module that can be used as preprocessing module 210 is the information extraction module, SERIF, available from BBN Technologies Corp. of Cambridge, Mass. SERIF is described further in "Experiments in Multi-Modal Automatic Content Extraction" by L. Ramshaw, et al., published in *Proceedings of HLT*-01 in 2001, the entirety of which is incorporated herein by reference.

Name variation module 220 receives extracted named entities from preprocessing module 210 and preferably provides a set of equivalent names for each of the extracted names, where the set of equivalent names represents a cluster of names that potentially (but not necessarily) refer to the same global entity. In this illustrative embodiment, name variation module 220 includes name variation processor 206 and name variation database 207. Name variation processor 206 preferably generates sets of equivalent names for each extracted named entity by utilizing a number of algorithms. In this embodiment, each of the algorithms targets a specific name variation problem. For example, one algorithm can target misspellings, while another targets aliases.

The name variation algorithms employed by name variation processor 206 preferably augment the initial set of extracted names to obtain an augmented set of names. Augmentation can be performed using various information sources, such as world knowledge, web knowledge, letter substitution, and other corpus statistics. Similar to the targeted problems, each algorithm can augment the extracted names using a different technique. Therefore, the various algorithms can operate on overlapping, but not necessarily identical, names. Because some information sources are more reliable than others, name variation processor 206 (or another preprocessing module) assigns to each algorithm a confidence level rating that is based on the sources of equivalency employed by the algorithm. For example, an algorithm that retrieves aliases from a highly reliable manually-edited aliases database can be assigned a confidence level of 0.95-1.00, while one that determines matches based on a string comparisons can be assigned a confidence level rating of 0.40-0.45. Thus, for each name pair of names in the augmented set of names used to be analyzed by an algorithm, the algorithm assigns an algorithm-specific similarity score that is based on a combination of the confidence level rating of the algorithm and an internal score assigned to the pair by the algorithm based on degree of similarity. For each unique pair, name variation processor 206 preferably determines a similarity score for the pair, by, for example, selecting the highest algorithm-specific scores assigned to the pair. Name variation processor 206 then accumulates a set of equivalent names for each of the extracted named entities based on the similarity scores assigned to the name pairs. Name variation processor 206 preferably accumulates the name pairs by selecting name pairs that have a similarity score above a given threshold.

Name variation database 207 stores the sets of equivalent names produced by name variation processor 206. As described above, some equivalence sources and algorithms may be more reliable than other sources for generating alternative names. As a result, name variation database 207 also preferably stores the source of the alternative name, as well as the internal score assigned by the source algorithm to the pair. Name variation database 207 preferably stores information about names without regard to the actual document-level entities from which name variation processor 206 derived the equivalent sets.

Disambiguation module 230 analyzes each set of equivalent names provided by name variation module 220 and produces one or more clusters that refer to distinct global entities. Clusters are preferably built with multiple document-level entities. Entity disambiguation that uses clusters (rather than pairs of names/entities) are more effective overall because the cumulative feature statistics associated with clusters generally provide more distinctiveness than statistics associated with name pairs. For example, a cluster consisting of 5 document-level entities for "Joe, the plumber" has a strong indication that another document-level entity for "Joe, the lawyer" should not belong to the cluster. Disambiguation module 230 preferably analyzes the names in the equivalent name sets using other entity-based feature information to distinguish between the names. In this illustrative embodiment, disambiguation module 230 includes featurization module 208, clustering processor 209, and clusters database 211.

Featurization module 208 provides entity-based feature distinction. Featurization module 208 preferably distinguishes between named entities using events, relations, and other descriptors that provide context-specific links between the names and the events or relations extracted from document mentions of the named entity. For example, assume the following sentence is extracted from a document mention of the named entity "Ali Abbas":

As Ali Abbas happily watched Tom and Jerry on his mini television, he transformed from the pain-racked boy who left the city of Baghdad.

The featurization module 208 determines that "Ali Abbas", "he", "his", "boy", and "who" all refer to the same entity, while "city" and "Baghdad" refer to a second entity. Using the event from this sentence, the entity featurizer links the entity "Baghdad" with the entity "Ali Abbas" though the anchor "left" to produce the pair:

Ali Abbas↔Baghdad

Distinguishing features can also be obtained from entity descriptors (such as titles, occupations, and positions), metadata associated with the documents (such as document dates and times of articles, document types, poster or speaker information, etc), and other textual relations (such as "also known as", "commonly known as", "aka", "formerly", and "maiden name") that can serve as anchors for featurization when they link two or more names.

Clustering processor 209 performs clustering of document-level entities by analyzing the set of equivalent names provided by name variation module 220 using context provided by the featurization module 208 and/or other sources of information. Clustering processor 209 begins by splitting the set of equivalent names into singleton clusters based on document mentions of the named entities in a set of equivalent names. Clustering processor 209 then iteratively merges the singleton clusters using feature information obtained from featurization module 208. For example, in the featurization example provided above, the link between Ali Abbas and Baghdad can be used by clustering processor 209 to disambiguate entities containing the name Ali Abbas or its equivalences. Clustering processor 209 preferably merges the singleton clusters using an agglomerative clustering algorithm, starting with the most distinctive features. One way to determine whether two singleton clusters are to be merged is to assign discriminatory weights to the various features used by the algorithm, and accumulate the weights with each merging stage. Clustering processor 209 computes a score for each merged cluster based weights assigned to the features that form the basis of the merge.

Clusters database 211 stores the clusters produced by clustering processor 209. Clusters database 211 preferably includes two sets of tables. The first set of tables preferably contains disambiguation features, such as document topics, names from relations and events, associated descriptors, etc. The second set of tables preferably contains information about clusters, cluster-associated features, and the features' statistics. Output documents 212 includes entity-specific clusters of name strings, where each cluster refers to a unique global entity. Clustering processor 209 preferably provides output documents 212 in XML format.

FIG. 3 is an example of the operation of system 200, according to one illustrative embodiment of the invention. Name strings 310 are extracted by extraction module 202 and, in this example, include several name strings under consideration for cross-document resolution. Name pairs 320 represent potentially matching name pairs generated by name variation module 220 and their corresponding similarity scores assigned by name variation processor 206. In this example, the pair {Mahmoud Abbas, Abu Mazen} has a similarity score of 0.9, indicating a 9 out of 10 likelihood that the two names potentially refer to the same entity. Similarly, the pair {Mahmoud Abbas, Abu Abbas}, has a similarity score of 0.7, indicating a 7 out of 10 likelihood that the two names potentially refer to the same entity. In alternative embodiments, the similarity score may be a raw score without a direct mathematical relationship to probabilities or likelihood values. Item 330 shows a set of equivalent name strings accumulated by name variation processor 206 based on the similarity scores. The set of equivalent names captures those name strings that potentially refer to the same global entity. This set of equivalent names, along with similarity scores, are preferably stored in name variation database 207 for further processing.

In this example, further processing on equivalent set 330 includes disambiguation by entity disambiguation module 230 (FIG. 2). For large document sets, disambiguation module 230 preferably clusters over subsets to improve system scalability. Therefore, in this instance, equivalent set 330 is preferably derived from a subset of a large document corpus (e.g., one containing about 1 million documents). Document entity mentions 340a-c are extracted based on the name strings included in the set of equivalent names 330. Clustering processor 209 uses the document entity mentions, along with other information obtained from the entity featurization module 208 (FIG. 2), to determine which of the names in the equivalent set refer to distinct global entities. In this example, clustering processor 209 determines that cluster 350, which includes the names Mahmoud Abbas and Abu Mazen, refers to one entity (i.e., the Palestinian Leader), while cluster 360, which includes the names Muhammed Abbas and Abu Abbas, refers to another distinct entity (a convicted terrorist).

Therefore, by analyzing all named entities contained in the document corpus, a set of entity clusters is created to represent the named entities, where each cluster represents a unique global entity.

Figure 4A:
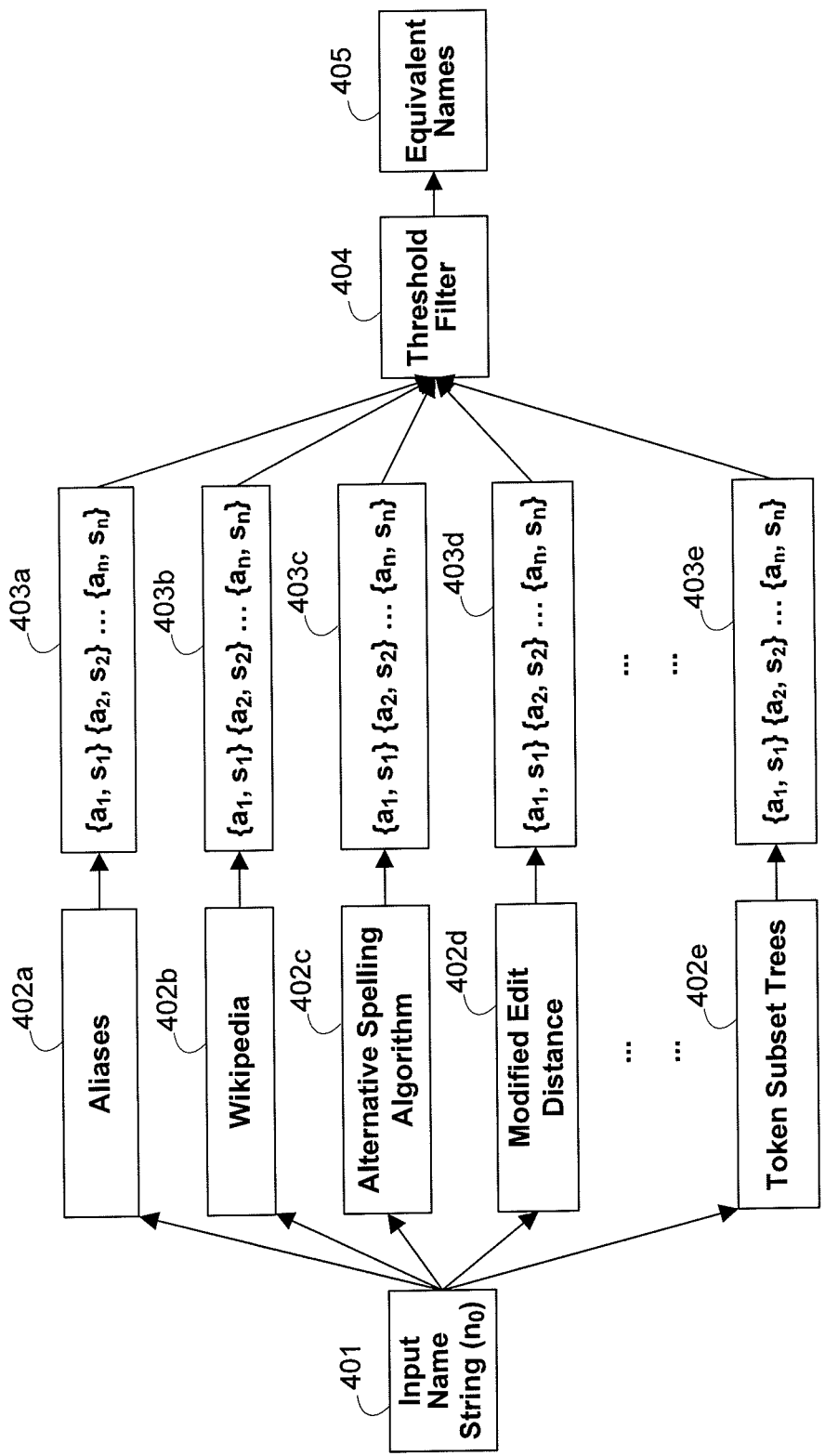
FIG. 4A is an illustrative name variation block diagram according to one illustrative embodiment of the invention.

FIG. 4A shows examples of the algorithms that can be used by illustrative name variation processor 206 to analyze entity names in a document corpus and provide equivalent name sets that potentially refer to the same global entity. In the example of FIG. 4A, name variation processor 206 generates a set of equivalent names for input name string 401, which is obtained from extraction module 202, information extraction database 203, or another suitable source. Generally speaking, name variation processor 206 employs one or more matching algorithms to determine an equivalent set of names for input name string 401. In this example, name variation processor 206 employs Aliases algorithm 402a, Wikipedia-based algorithm 402b, Alternative Spelling algorithm 402c, edit distance algorithm 402d, and token subset tree algorithm 402e. Name variation processor 206 preferably executes algorithms 402a-e in parallel wherever possible, in order to efficiently utilize batch queues. In other embodiments, name variation processor 206 can execute the algorithms in series or can employ a combination of serial and parallel execution.

Illustrative Aliases algorithm 402a obtains known aliases for the input name string 401. Aliases include persons' alternative names, organization abbreviations, names of terrorists and terrorist groups, as well as some alternative spellings for geopolitical entities and locations. Sources of alias information used by aliases algorithm 402a include internet sources, as well as manually-edited databases of aliases. As the information in aliases lists is typically based on reliable and verified information, aliases algorithm 402a generally has a high confidence level and equivalent names produced by aliases algorithm 402a generally have the highest similarity scores. As geographical names tend to be ambiguous (multiple locations sharing the same name), aliases algorithm 402a employs several heuristics in order to improve the accuracy level of the alternative names. For example, the algorithm returns alternative names only for those locations and geopolitical entities which have population sizes greater than zero, and if alternative names refer to more than one entity, only those pointing to a more populous location are returned.

Illustrative Wikipedia algorithm 402b relies on page titles, and redirect and disambiguation information, provided by the Wikipedia online encyclopedia to link input name string 401 with potentially matching variants. In Wikipedia, a page title either uniquely identifies the Wikipedia article to which it refers, or otherwise identifies a redirect page or a disambiguation page for the same article. Moreover, Wikipedia only includes one article, not including the redirect or disambiguation pages, for any given entity/subject. For example, the Wikipedia page title for the article referring to Benjamin Franklin (the Founding Father of the United States) is different from the page title for the article referring to Benjamin Franklin (the $19^{th}$ century religious leader). Using this information, Wikipedia algorithm 402b creates a list of largely unambiguous page titles, each referring to a unique entity. This list preferably forms the basis of alternative matching strings produced by Wikipedia algorithm 402b. For example, for a given name string, Wikipedia algorithm 402b first determines whether a page title exists for the name. If not, the algorithm does not produce any alternatives. Otherwise, alternatives for the name string can be obtained from a canonical page for the entity (i.e., a page that contains an article about an unambiguous entity) and/or from the redirect pages for the entity.

Illustrative Alternative Spelling algorithm 402c generates potential variants for input string 401 based on misspellings and other distortions of input name string 401. In some embodiments, algorithm 402c relies on a list of language-specific character/string substitutions to produce different spellings with the same or similar sound as the input name string. For example, the algorithm can generate language-specific lists of letter (or letter combination) spelling corrections based on common errors produced by machine translations from the source language of the name string 401. The substitutions create alternative spellings of the name. If the correct version of the name is in the corpus, the algorithm creates a link between the potentially misspelled input string the corrected version. In some embodiments, Alternative Spelling algorithm 402c creates variants by mapping a possibly misspelled machine translation of the input name string back to the original language (where it might have only one accurate spelling) in order to detect a misspelling or distortion. In some embodiments, the original input string, as well as the variants, can be provided as "hints" to a statistics-based spell checker (such as, e.g., Google Spell-Checker) to generate variants based on the frequency of occurrence of the input name or its generated variants on the Internet.

Illustrative edit distance algorithm 402d targets lexical similarities between names. Under this algorithm, two names are considered alternatives if they share some minimum amount of lexical similarities. Edit distance algorithm 402d preferably assigns discriminative editing costs to characters in order to account for differing frequency of occurrence of character substitutions. For instance, substituting a character "b" for character "p" has a smaller cost than substituting "b" for "s". In some embodiments, edit distance algorithm 402d uses lists of stop words and common nouns to ignore specific word tokens in the name strings it attempts to match. For instance, when assigning a distance score between names "Criminal Procedure Law" and "School of Criminal Procedure Law," the word "School" is skipped as a common name and the article "of" is ignored as a stop word. In some embodiments, edit distance algorithm 402d ignores entity type specific modifiers (e.g., Mr., Jr., II, Corp., Ltd., etc). As applied to entity names, these enhancements advantageously improve the tolerance of the traditional edit distance algorithm to many common errors, such as transliteration in machine translation, and improve the overall confidence level of matches produced by edit distance algorithm 402d.

Figure 4B:
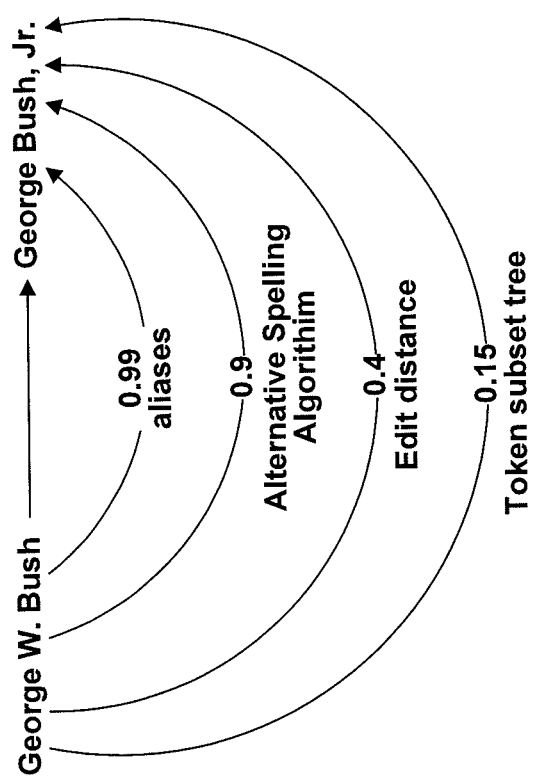
FIG. 4B is an example of applying aspects of the name variation block of FIG. 4A, according to an illustrative embodiment of the invention.
Figure 4C:
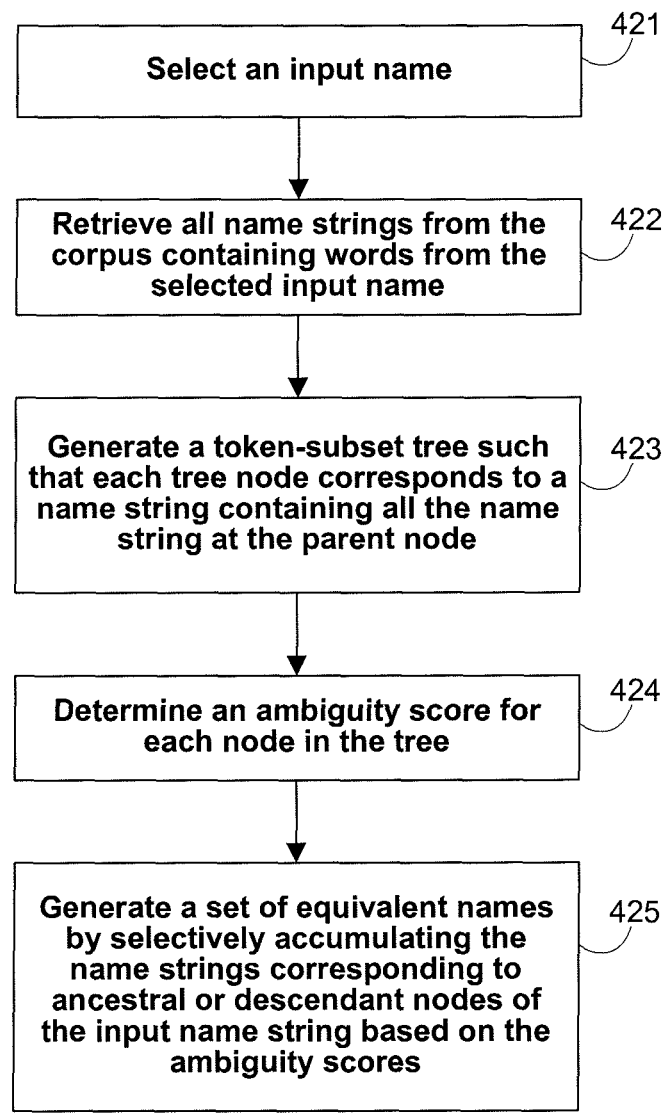
FIG. 4C is a flowchart of a method for generating token-subset trees, according to an illustrative embodiment of the invention.

Token-Subset Tree (TST) algorithm 402e generally applies to name variants that share some or most words (or "tokens"). Starting with tokens obtained from the input name, the algorithm builds tree-like structures out of all the unique names in the corpus that have tokens that overlap with those of the input name strings, and accumulates names into an equivalent set based on an ambiguity score assigned to the names in the tree. TST algorithm 402e will be described with reference to FIGS. 4C and 4D. FIG. 4C shows illustrative process 420 for a TST algorithm and FIG. 4D is an example of a token-subset tree built according to an embodiment of the algorithm.

Referring to process 420 in FIG. 4C, at step 421, name variation processor 206 selects an input name string (e.g., input name string 401 of FIG. 4A). At step 422, name variation processor 206 retrieves all name strings from the corpus that contain words from the selected input name. At step 423, name variation processor 206 generates a rooted directed acyclic tree having as nodes the input name string and the additional name strings retrieved at step 422. Generally, name variation processor 206 generates a token-subset tree rooted at the selected input name such that each tree node corresponds to a name string containing all the words from the name string of a parent node of the tree node.

Figure 4D:
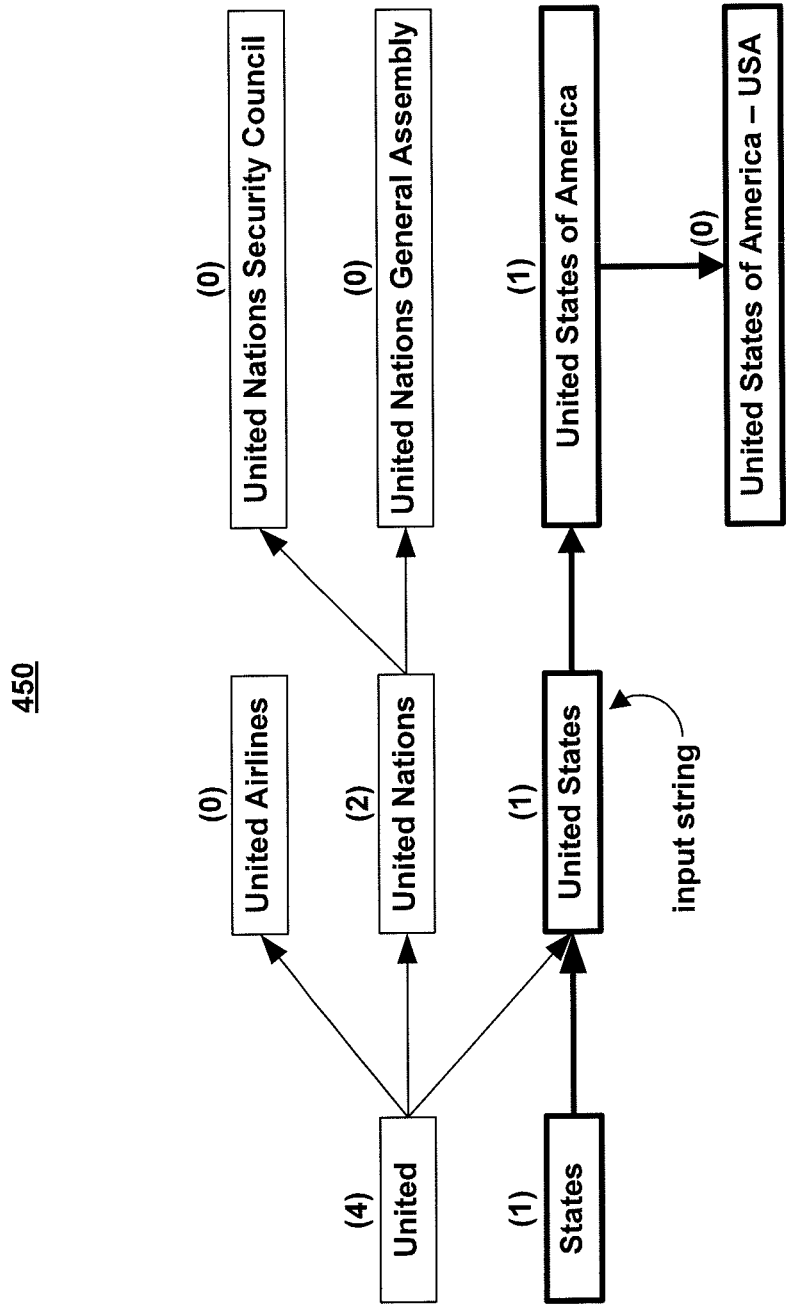
FIG. 4D is an example of applying the method illustrated in FIG. 4C, according to an illustrative embodiment of the invention.

Thus, referring to the example of FIG. 4D, the input name string is "United States," which includes the words or tokens "United" and "States." It is worth noting that "United" and "States," in addition to being tokens in an input string, are also each name strings extracted from the corpus. In this instance, name variation processor 206 retrieves from the document corpus for the token "United" the name strings: "United," "United Nations," "United States of America—USA," "United Airlines," "United States," and "United States of America." Likewise, for the token "States," name variation processor 206 retrieves from the document corpus: "States", "United States", "United States of America", and "United States of America—USA." Therefore, Token-Subset tree 450 is constructed with all unique name strings retrieved for "United" and "States" as nodes. Generally speaking, each name string in the document corpus is associated with a token-subset tree. For example, name variation processor 206 can generate trees in an order determined by the length of the name strings, such that token-subset trees for shorter name strings are created first. Thus, in some embodiments, token-subsets for longer names are simply extracted from the token-subset trees for shorter names that contain all the words of the longer names. This advantageously obviates the need to generate a separate token-subset tree for each name string in the corpus. Name variation processor 206 preferably sorts the name strings by string length prior to constructing the TS tree. Sorting advantageously improves the determinism of the algorithm and minimizes the number of comparisons performed in order to construct the graph. In Token-Subset tree 450, an edge exists between a parent node and a child node if the parent node is a token subset of the child node. At step 424, name variation processor 206 determines an ambiguity score for each node in the tree.

One way to determine an ambiguity score for the tree nodes is to assign a "meaning count" to each node in the tree. The meaning count indicates the number of potentially distinct entities to which the name at node refers. The higher the meaning count of a node, the greater the number of potential entities to which it refers, and vice versa. In this embodiment, the meaning count of a node is the number of leaves descending from the node. In the example of FIG. 4D, "United" has a meaning count of 4, while "States" has a meaning count of 1. A meaning count of 1 indicates that all the names on the path descending from the node include all the tokens of the node, and are the only names in the corpus that do so. Therefore, if a node has a meaning count of 0 or 1, the node is deemed unambiguous and the algorithm concludes that all the names on the path descending from the node potentially refer to the same entity. It is important to note, however, that the meaning count of a node, and therefore its ambiguity score, can change depending on the information contained in the corpus. For example, while "States" in the example of FIG. 4D is unambiguous based on information currently contained in the corpus, the addition of "African States" (if such an entity existed) to the corpus would raise the meaning count of that node and render it ambiguous.

Process 420 continues at step 425. At step 425, name variation processor 206 generates a set of alternative names for the TST algorithm by selectively accumulating the name strings corresponding to ancestral or descendant nodes of the input name string based on the ambiguity scores. In the example of FIG. 4D, the relevant branch is the branch that includes the input name string "United States," and the set of unambiguous alternative names are {"States", "United States of America," "United States of America—USA"}. The reliability of the set of alternative names returned by this illustrative TST algorithm depends on the extent of the information in the corpus. The larger the corpus, the more accurate the outcome, because the higher the likelihood of detecting ambiguities. Moreover, the TST algorithm matching process can be improved by augmenting the node-matching with context outside of lexical similarities. One way to augment is by co-reference. Augmentation by co-reference includes identifying a real-world object, concept, or event relating to one or more nodes in the tree, and then searching the document that the query belongs to for alternative names that correspond to the same real-world object, concept, or event as the one or more nodes in the tree.

Returning to FIG. 4A, alternative name-scores 403a-e illustrate respective outputs of the illustrative algorithms described above. The output for each algorithm preferably includes one or more alternative name strings $a_i$ and a corresponding algorithm-specific similarity score $s_i$ that reflects the algorithm-specific likelihood that $a_i$ and the input name string $n_0$ refer to the same entity. As describe above, the algorithm-specific similarity score $s_i$ is based on a confidence level assigned to the algorithm or its source of equivalency, and an internal score that is based on the degree of similarity between $a_i$ and $n_0$ as determined by the algorithm. Thus, the same name pair can be assigned a different algorithm-specific score by each algorithm under which it is analyzed. For example, in FIG. 4B, the name pair {George W. Bush, George Bush, Jr.} is assigned an algorithm-specific similarity score of 0.99 by aliases algorithm 402a, 0.9 by Alternative Spelling algorithm 402c, 0.4 by edit distance algorithm 402d, and 0.15 by Token-Subset Tree algorithm 402e.

Returning to FIG. 4A, threshold filter 404 determines which of the alternative name strings analyzed by the algorithms to include in the equivalent name set 405 for the input name string $n_0$. Threshold filter 404 preferably applies a threshold to the algorithm-specific scores, and accumulates each unique alternative name string $a_i$ into the equivalent set 405 if the highest algorithm-specific score assigned to $a_i$ is greater than or equal to the threshold. A number of considerations affect the specific threshold value used by threshold filter 404. For example, threshold values can depend, in large part, on the specific algorithms employed by name variation processor 206. For example, an algorithm that computes the similarity between strings based on their character overlap can have a threshold of 0.6, which means that at least 60% overlap is required to consider the strings similar. However, other algorithms such as those that are based on aliases lookup, can have a threshold of 1, which represents the existence of an alias link. Therefore, the specific threshold value used by threshold filter 404 can be set higher or lower depending, for example, on the actual algorithms used, or expected to be used, by a particular name variation run.

The algorithms described above are merely illustrative, and do not represent a complete set of algorithms that can be employed by name variation processor 206. For example, name variation processor 206 can also employ various extraction algorithms that derive equivalences from the data produced by information extraction module 202. In some embodiments, information extraction module 202 provides output from within-document name co-reference. Name variation processor 206 uses the within-document co-reference results to produce name-linking statistics. The within-document co-reference system links names within a document based on several built-in heuristics/features. Statistics can be produced by gathering multiple occurrences of the same name links across documents. With enough cross-document evidence on a link between two names, the information can be used both as a way to link alternatives and as training for future decisions.

Figure 5:
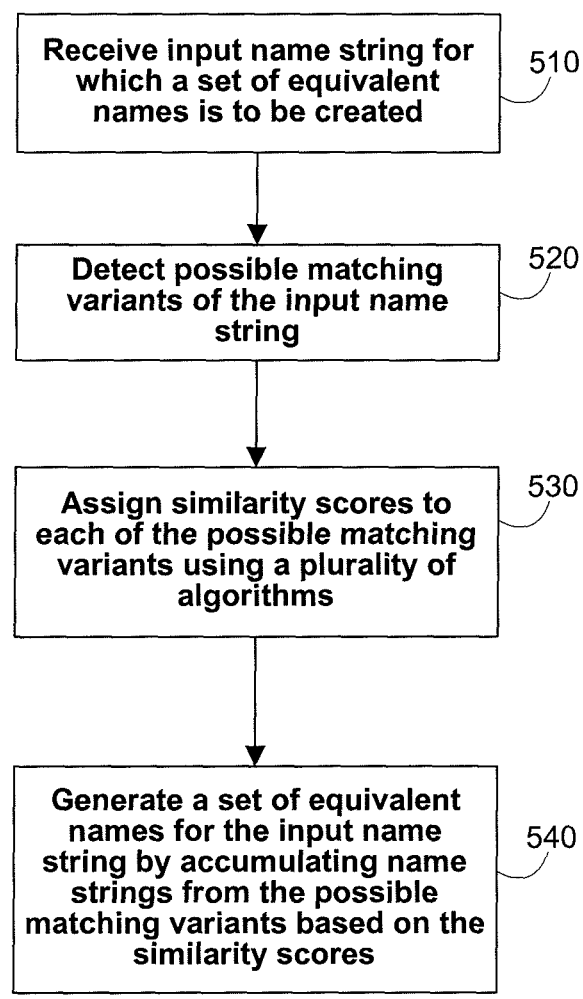
FIG. 5 is an illustrative flowchart of a method for generating a set of equivalent names, according to an illustrative embodiment of the invention.

FIG. 5 is an illustrative flowchart of a process 500 for generating a set of equivalent names, according to an illustrative embodiment of the invention. In an embodiment, at step 510, name variation processor 206 (FIG. 2) receives an input name string for which a set of equivalent names is to be created. The input name string preferably is a part of several names extracted from a document corpus, where the extracted names form an initial set of possible matching names for the input name. At step 520, the name variation processor 206 retrieves additional possible matching variants for the input name string. For example, name variation processor 206 (FIG. 2) retrieves aliases for the input name string using Aliases algorithm 402a, and Wikipedia algorithm 402b, and then additional potential variants using Alternative Spelling algorithm 402c, edit distance algorithm 402d, and Token-Subset Trees algorithm 402e (all of FIG. 4A) to obtain an initial set of potential matches for the input name string. In some embodiments, process 500 has a limit on the number of possible matching variants. In these embodiments, process 500 begins by retrieving variants from the most reliable sources and then progresses through other sources in decreasing order of reliability until the limit is reached or the sources are exhausted. For example, the aliases and the alternative names from the Wikipedia algorithm are considered the most reliable equivalent names and are retrieved first in these embodiments. For new variants added, more aliases are retrieved, which in turn triggers another run of the algorithms. The iterations continue until no new alternative names can be added, or a predefined limit on the initial set of alternative names is reached.

Process 500 continues at step 530. At step 530, name variation processor 530 assigns similarity scores to each of the possible matching variants using the plurality of algorithms. As described above, each algorithm employed by name variation processor 206 preferably assigns an algorithm-specific score to each pair, and a similarity score for the pair is determined as the highest algorithm-specific score. The process continues at step 540 where threshold filter 404 generates a set of equivalent names for the input name string by accumulating name strings from the possible matching variants based on a comparison between a threshold and the similarity scores.

Therefore, by analyzing all named entities contained in the document corpus, a set of equivalent names that potentially refer to the same entity is generated for the input name string.

Figure 6:
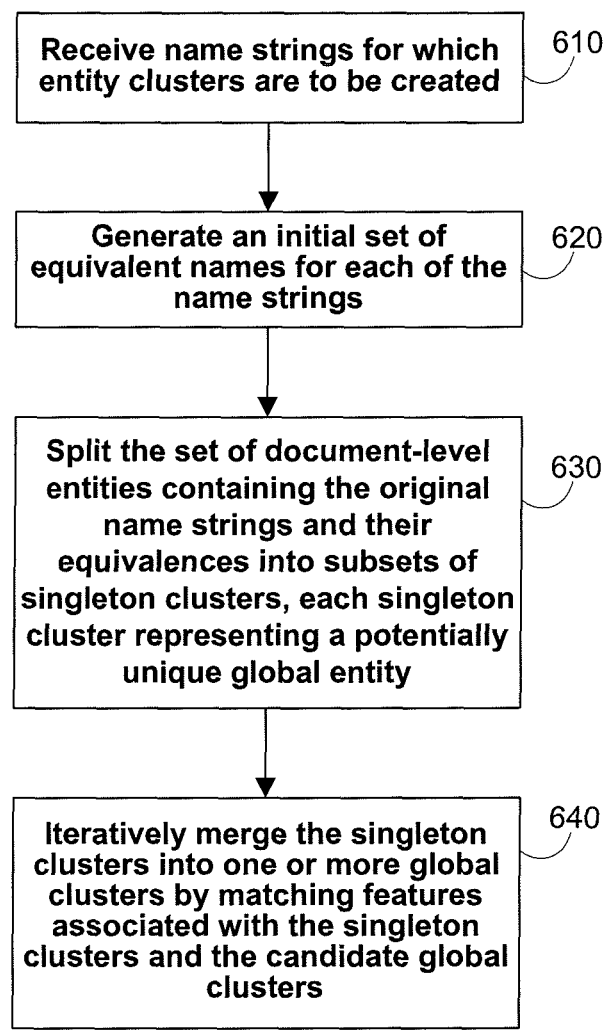
FIG. 6 is a flowchart of a method for generating disambiguation clusters, according to an illustrative embodiment of the invention.

A second aspect of the invention involves determining when names in a set of equivalent names refer to distinct global entities by generating disambiguation clusters that refer to unique global entities. FIG. 6 is a flowchart of illustrative process 600 for generating disambiguation clusters, according to an illustrative embodiment of the invention. At step 610, an entity disambiguation module 230 receives name strings for which entity clusters are to be created. In this embodiment, the received name strings include name strings extracted by preprocessing module 210 (FIG. 2) and for which disambiguation clusters have not been created. At step 620, a name variation module generates an initial set of equivalent names for each of the received name strings. In this embodiment, name variation module 220 (FIG. 2) generates the sets of equivalent names. However, any suitable name variation module can be used.

At step 630, the disambiguation module splits the set of document-level entities containing the original name strings and their equivalences into subsets of singleton clusters. For instance, referring to the example of FIG. 3, the disambiguation module splits the document-level entities into three singleton clusters based on entity mentions 340a-c. The disambiguation module preferably performs this initial splitting using hints and other contexts extracted from within-document name mentions and linked by an entity featurization module 208. As described above, featurization module 208 links named entities with events, topics, relations, and other metadata using relational anchors that provide context for document level entity mentions.

The process continues at step 640, where a disambiguation module (e.g., clustering processor 209 of FIG. 2) iteratively merges the singleton clusters of step 630 into one or more global clusters by matching features associated with the singleton clusters and the candidate global clusters. Disambiguation module 209 preferably employs an agglomerative clustering algorithm when merging the singleton clusters. The agglomerative clustering algorithm merges two clusters into one when it obtains threshold of evidence that the two refer to the same global entity. The evidence is preferably obtained by comparing cluster features. One way to determine whether two singleton clusters are to be merged is to assign discriminatory weights to the various features used by the algorithm, and accumulate the weights with each merging stage. Combined, the weights represent a score, which is assigned to a cluster pair and indicates the confidence the two clusters refer to the same global entity.

Because each merge can increase the precision of clustering process and certainty regarding the global entity, the algorithm preferably merges in an order dictated by the distinctiveness of the cluster features. Therefore, in a first merging stage, the algorithm preferably merges clusters based on the most discriminatory features, such as descriptors or associated relation and event names. In some embodiments, the disambiguation module merges the clusters obtained at this first stage into already-resolved clusters for the global entity. In subsequent stages, other less discriminatory features are used as bases for merging. Merging in these stages is preferably iterative, and is informed by information obtained from the resolved cluster into which the new clusters are to be merged. For example, because of the reduced certainty provided by the less discriminatory features, the clustering algorithm preferably merges based on these if they do not conflict with any feature of the resolved cluster, and/or are corroborated by information obtained from the resolved clusters. In some embodiments, when a merge between clusters occurs, the system updates statistics associated with a new cluster. Since a cluster holds information about its underlying document-level entities, upon a merge, the cluster's feature counts and ratios are recalculated. For example, assume there are three clusters, each containing one document-level entity mentioning "George Bush". In addition to the names, each of the clusters contains descriptor mentions. The first cluster contains 3 descriptors: "governor", "president", and "leader". The second and the third clusters each contain 1 descriptor: "president". Before the merge, there is generally no strong indication on the dominant descriptor/title in any of the three clusters. After the merge, the descriptor "president" associated with the resultant cluster occurs more times than all other descriptors combined (i.e., 3 for "president" vs. 2 for "governor" and "leader" combined). Therefore, in this example, the descriptor "president" is deemed more discriminative in its representation of global truth. Similar approaches can be applied to other entity and document features, such as context names, relations, events, document topics, and so on.

Therefore, by analyzing all named entities contained in the document corpus, a set of entity clusters is created to represent the named entities, where each cluster represents a unique global entity.

The invention may be embodied in other specific forms without departing from the spirit or essential characteristics thereof. The foregoing embodiments are therefore to be considered in all respects illustrative, rather than limiting of the invention.

What is claimed is:

1. A system that detects similarities between name strings in a document set, comprising:
   a processor and a memory, the memory comprising a preprocessing module, a matching module and a generation module;
   the preprocessing module configured to:
      extract a plurality of name strings from the document set by generating additional name strings based on an alternative spelling of one or more name strings in the document set, each name string comprising a similar entity with names that are misspelled, mistranslated, incorrectly transcribed, have multiple aliases, and/or have multiple equally valid spellings, the alternate spelling comprising determining typical misspellings, creating language specific lists of spelling corrections, and generating the alternative spelling based on the spelling corrections;
   the matching module configured to:
      detect possible matching pairs from the plurality of name strings, and
      detect a plurality of similarity scores to each of the possible matching pairs using a plurality of algorithms that execute in parallel; and
   the generation module configured to:
      generate a set of equivalent names by its relating name strings from the possible matching pairs based on a comparison between the similarity scores and a threshold.

2. The system of claim 1, wherein the matching module is configured to assign similarity scores by a signing an algorithm-specific to each possible matching pair for each of the plurality of algorithms.

3. The system of claim 2, wherein the algorithm-specific score for an algorithm is based at least in part on a confidence level associated with a source of equivalency used by the algorithm.

4. The system of claim 1, wherein each of the plurality of algorithms the text a different type of equivalence between the name strings in each of the possible matching pairs.

5. The system of claim 1, wherein the generation module is configured to generate a set of equivalent names by selecting from the plurality of similarity scores for each possible matching pair the highest similarity score for the pair and comparing the highest similarity score for each pair to the threshold.

6. The system of claim 1, wherein the memory further comprises a storage module configured to store a set of equivalent name strings in a database.

* * * * *